July 6, 1926.

C. F. RIED

WINDMILL SAFETY PIN

Filed Nov. 9, 1923

1,591,781

WITNESSES

INVENTOR
C. F. RIED

BY

ATTORNEYS

Patented July 6, 1926.

1,591,781

UNITED STATES PATENT OFFICE.

CHRISTIAN F. RIED, OF PALMYRA, NEBRASKA.

WINDMILL SAFETY PIN.

Application filed November 9, 1923. Serial No. 673,798.

My invention relates to a pin employed for connecting a windmill plunger to a pump and the general object of my invention is to provide a pin for the indicated purpose having members thereon adapted to so engage the connected parts when the pin is in place as to prevent accidental withdrawal of the pin.

A more specific object of the invention is to provide for a safety pin that will automatically turn to the safety position and prevent displacement of the pin but at the same time may be readily moved to a position to permit of the convenient removal of the pin.

Reference is to be had to the accompanying drawings forming a part of this specification, it being understood that the drawings are merely illustrative of one example of the invention.

In carrying out my invention in accordance with the illustrated example the pin 10 is adapted to be passed through a transverse hole $a$ in plunger A and in an alining hole $b$ in the usual fitting B of the rod section C.

Figure 1:
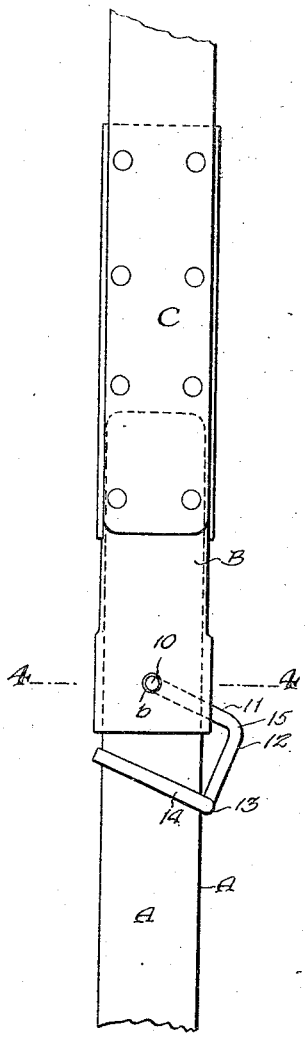
Figure 1 is a face view of a connected plunger and pump rod with my improved safety pin in safety position with the pin locked against accidental displacement.

The pin 10 is formed from a length of rod or wire the material of which is bent as follows: From an end of the pin the material is bent at approximately right angles to form a member 11 and bent to form a member 12 at right angles to the member 11. The pin 10 and the member 11 are in one plane and the member 12 is at right angles to said plane. The material is bent again to form a member 13 at right angles to the member 12, said member 13 being parallel with the pin proper 10. The material is finally bent to form a terminal member 14 in a plane transverse to the plane of the pin 10. All the members except the extreme end of the terminal member 14 lie at one side of the pin 10, thereby disposing the preponderance of weight at one side of the axis of the pin, whereby said members 10 will gravitate and rock the pin in the alined holes $a$, $b$. As seen in Figure 1 the pin 10 is in position and the weight of the members 11 to 14 have caused said members to rock the pin so that the member 14 lies in front of the face of the plunger A. Obviously, therefore, the pin 10 cannot move axially to disconnect the connected elements $a$ and $b$ since any movement of the pin axially in one direction will cause the member 11 to contact with one face of the plunger A while axial movement of the pin in the other direction will cause the terminal member 14 to contact with the opposite face of said plunger A.

Figure 2:
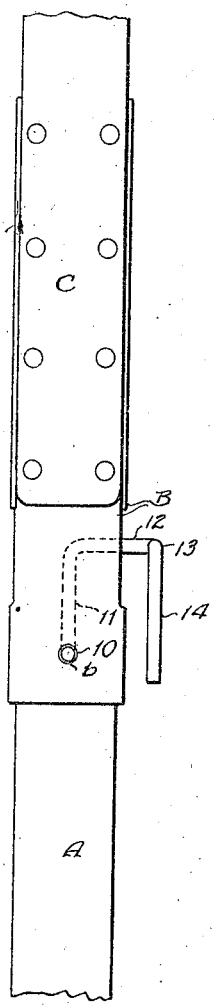
Figure 2 is a view similar to Figure 1 but with the pin turned to a position to permit its removal.
Figure 3:
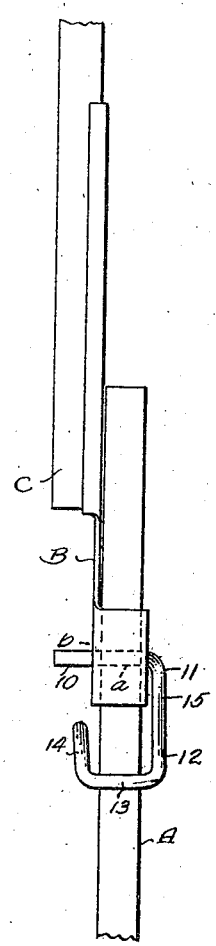
Figure 3 is an edge view of the plunger and rod section, that is to say, a view at right angles to Figure 1 and with the pin in safety position.
Figure 4:
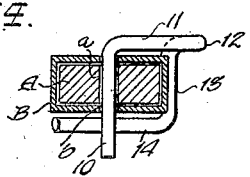
Figure 4 is a horizontal section on the line 4—4, Figure 1.
Figure 5:
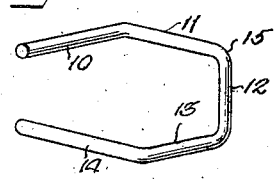
Figure 5 is a perspective view of the pin.

The pin 10 may readily be rocked about its axis to swing the member 14 from in front of the plunger A as shown in Figure 2, thereby permitting the pin 10 to be moved axially out of the alined holes $a$, $b$. It will be observed that the final or terminal member 14 and the first bend 11 lie at opposite sides of the plunger A and that the two intermediate members 12 and 13 are, in the locking position of the device, both disposed at that side of the plunger between the said opposite sides. An advantage of the particular formation of my improved device results in the maximum convenience in disposing the device in the safety position because there is no U-bend to be precisely registered with the plunger. The first member 11 guides the device in all positions and it is only necessary to dispose the terminal member 14 at the opposite side. Hence, by pressing the member 11 to dispose the pin 10 in the hole $b$ the device may be brought to the locking position readily by the hold on the member, the positions of the members 12 and 13 at the side between the members 11 and 14 not featuring in the locking engagement of the device with the plunger.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claim.

Having thus described my invention, I claim:

As an article of manufacture, a safety device for connecting a wind mill plunger with a pump, said device comprising a pin and safety members, a portion of said device bent at right angles to one end of the pin, then again at right angles to dispose a second portion at right angles with the pin, and a third time at right angles to the second portion between the second and third bends, and finally at right angles to the portion following the third bend to present a terminal disposed in a plane at right angles to the pin proper and in a plane parallel with the first portion and spaced from said first portion, the said terminal member and the first member adjacent said pin being thus positioned so as to lie at opposite sides of the wind mill plunger, and the two intermediate members of the device being positioned to lie at that side of the plunger between said opposite sides.

CHRISTIAN F. RIED.